United States Patent [19]

Hashimoto et al.

[11] Patent Number: 4,660,075
[45] Date of Patent: Apr. 21, 1987

[54] COLOR INFORMATION DETECTING DEVICE

[75] Inventors: Seiji Hashimoto; Shinji Sakai, both of Kanagawa, Japan

[73] Assignee: Canon Kabushiki Kaisha, Japan

[21] Appl. No.: 664,707

[22] Filed: Oct. 25, 1984

[30] Foreign Application Priority Data

Oct. 28, 1983 [JP] Japan ................. 58-203402
Oct. 28, 1983 [JP] Japan ................. 58-203403

[51] Int. Cl.[4] .................................. H04N 9/73
[52] U.S. Cl. .................. 358/29; 250/214 C; 354/428; 354/430; 356/222; 356/223
[58] Field of Search ............. 358/29, 50, 27, 44; 340/870.13, 870.04; 307/311, 243; 328/104, 154; 250/214 R, 214 A, 214 C, 214 SW, 214 L, 214 AG; 354/428, 430, 464; 355/38; 356/222, 223

[56] References Cited

U.S. PATENT DOCUMENTS

| | | | |
|---|---|---|---|
| 3,750,155 | 7/1973 | Oman | 340/870.04 |
| 4,037,234 | 7/1977 | Tunekawa et al. | 354/464 X |
| 4,160,264 | 7/1979 | Hailey et al. | 358/29 |
| 4,444,481 | 4/1984 | Mizokami | 354/464 X |
| 4,451,826 | 5/1984 | Fasching | 340/870.04 X |
| 4,473,797 | 9/1984 | Shiota | 340/870.13 X |
| 4,479,708 | 10/1984 | Tokuda | 250/214 C X |
| 4,512,643 | 4/1985 | Tokuda | 354/428 X |
| 4,574,303 | 3/1986 | Hashimoto et al. | 358/29 |

FOREIGN PATENT DOCUMENTS

0111421  7/1982  Japan ..................... 356/222

*Primary Examiner*—John W. Shepperd
*Attorney, Agent, or Firm*—Toren, McGeady & Goldberg

[57] ABSTRACT

A color information detecting device comprising a plurality of color detecting apparatus for detecting respective different color lights from each other, converting apparatus for producing an output in non-linear relation to the input signal, changeover apparatus for selectively applying the outputs of the color detecting apparatus to the converting apparatus, apparatus for coinciding a number of successive outputs of the converting apparatus, and computing apparatus for computing the coincided signals from the coincidence apparatus. The device also includes a first constant current source for applying current of a prescribed intensity and a second constant current source for supplying current of another intensity equal to the prescribed intensity times the intensity of the current supplied from the first source which are included so that another mode can operate. The outputs of the first and second constant current sources are selectively applied to the converting apparatus. These features have the advantage of achieving simplicity of the construction of the structure and stabilization of the temperature characteristics.

21 Claims, 6 Drawing Figures

COLOR INFORMATION DETECTING DEVICE

BACKGROUND OF THE INVENTION

1. Field of the Invention

This invention relates to a color information detecting device for use in detecting color temperature information, for example.

2. Description of the Prior Art

Figure 1:
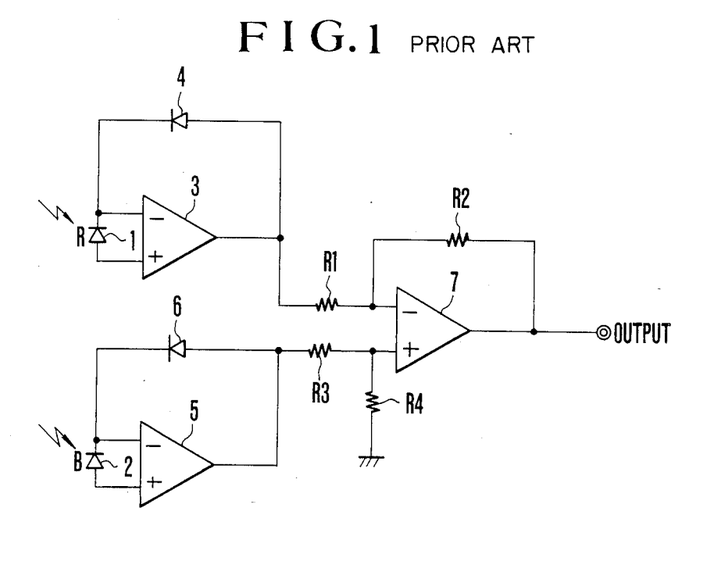
FIG. 1 is an electrical circuit diagram of the main parts of the conventional color density sensor.

A conventional example of the circuit for detecting color temperature information is illustrated in FIG. 1, where a red (R) component and a blue (B) component are detected by respective sensors 1 and 2 positioned adjacent to each other. The outputs of the sensors 1 and 2 are amplified by amplifiers 3 and 5 while being logarithmically compressed by diodes 4 and 6 so that an R signal and a B signal of restricted dynamic range are obtained at the output of the amplifiers 3 and 5. These signals R and B are then applied to a subtractor composed of resistors R1 to R4 and an amplifier 7. As a result, their ratio is obtained.

Depending on this ratio of the R and B signals, either a value of color temperature to be displayed, or a gain control signal for the color image pickup device is read from the information in a memory unit such as a ROM.

This is based on the assumption that the ratio of the R and B signals varies as a single-valued function of the color temperature.

In such a conventional color temperature detecting device, however, because it uses two logarithmic compression circuits composed of the amplifiers 3 and 5 and the diodes 4 and 6, besides the increased complexity of structure, and since the temperature characteristics of the diodes 4 and 6 are not always the same, the information obtained at the output of the amplifier 7 is likely to be erroneous. To correct this error, the outputs of the amplifiers 3 and 5 must be connected to respective specified correction circuits. A problem encountered is that to achieve sufficient correction is difficult.

It is, therefore, an object of the present invention to provide a color information detecting device which has overcome the drawbacks of the prior art.

Another object is to provide a color information detecting device of simplified structure while permitting superior correction of the achieved temperature characteristic.

SUMMARY OF THE INVENTION

A color information detecting device including a plurality of color sensing means for sensing different color lights from one another, converting means for a non-linearly converting an input signal, changeover means for selectively inputting the outputs of the color sensing means into the converting means, and computing means for coinciding the time-sequential outputs of the converting means and computing the coincided signals.

DETAILED DESCRIPTION OF THE PREFERRED EMBODIMENTS

Figure 2:
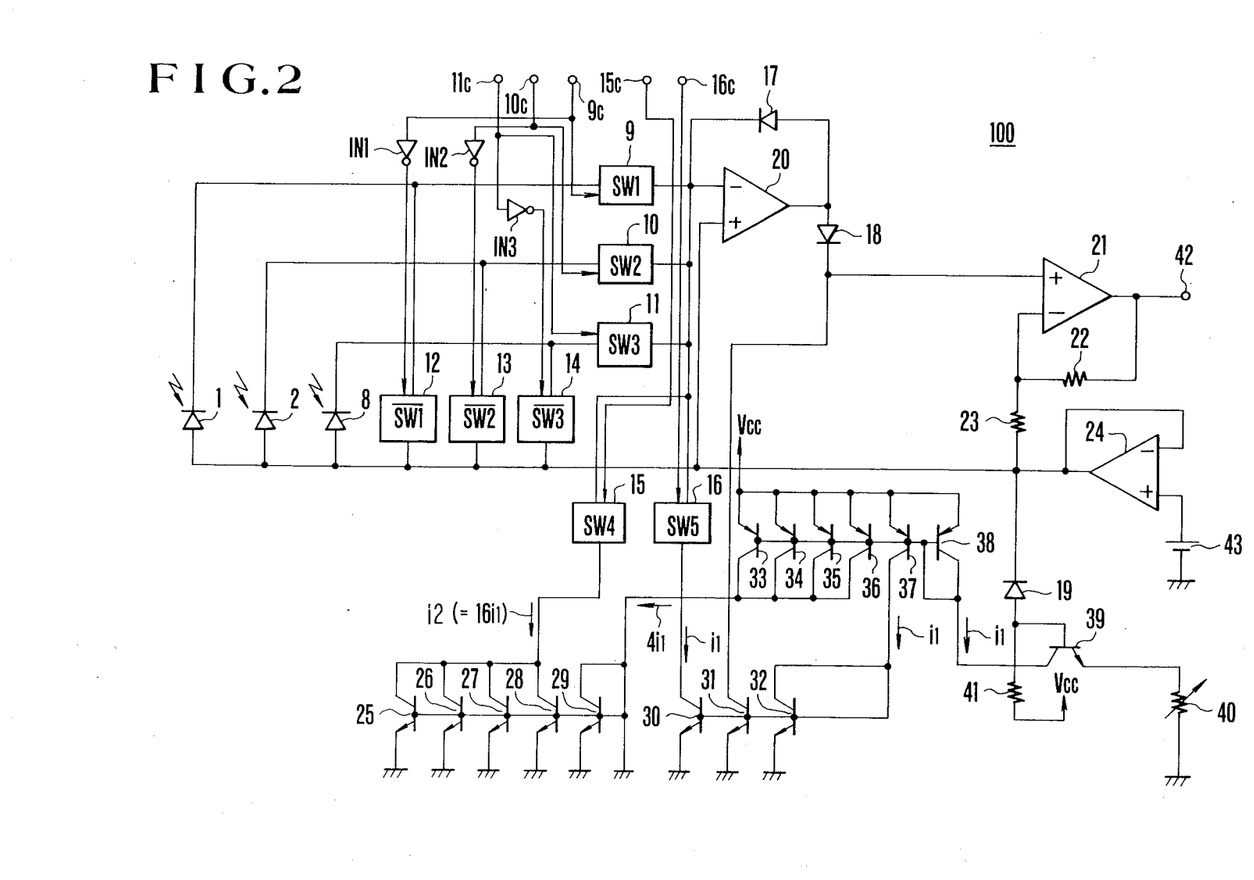
FIG. 2 is an electrical circuit diagram of the sensor in an embodiment of the color information detecting device according to the present invention.

The present invention is next described in conjunction with embodiments thereof. In FIG. 2, a sensor 100 of the color information detecting device of the invention includes the first photosensitive diode 1 as the red (R) light sensing means, the second photosensitive diode 2 as the blue (B) light sensing means, and a third photosensitive element 8 as the green (G) light sensing means. For each of the diodes 1, 2 and 8, a detectable range of wavelengths is specified by a color filter or an equivalent coating thereto. Of switching circuits 9 to 16, 9, 10, 11, 15 and 16 form changeover means.

Gating control signals for the switching circuits 9 to 14 are applied from an interface circuit (FIG. 3) to inlets 9c to 11c, which are connected directly to the respective ON-OFF control inputs of the circuits 9 to 11, and through respective inverters IN1 to IN3 to those of the circuits 12 to 14.

Other inlets 15c and 16c are connected to the respective ON-OFF control inputs of the switching circuits 15 and 16.

A logarithmic compression diode 17, as the non-linear conversion means, is connected in the feedback network of an amplifier 20.

The output of the amplifier 29 is connected through a diode 18 for compensation of the temperature characteristic of the reversed saturation current to a transistor 31, which constitutes part of a constant current source. The cathode of the diode 18 is also connected to the non-inverting input of a non-inverting amplifier 21.

The gain of the amplifier 21 is fixed by resistors 22 and 23, and it may be built in an IC.

A reference voltage source 43 supplies a reference voltage to the amplifiers 20 and 21 and the diodes 1, 2 and 8 through a buffer amplifier 24.

A diode 19, a resistor 41 and transistors 25 to 39 constitute a first constant current source with the transistors 30-32 and a second constant current source with the transistors 25 to 29 and 33 to 36. It should be pointed out here that a current i1 from the first source is related to a current I2 from the second source as 1 to 16 in intensity. The intensity of the current i1 is adjusted by a variable resistor 40.

Figure 3:
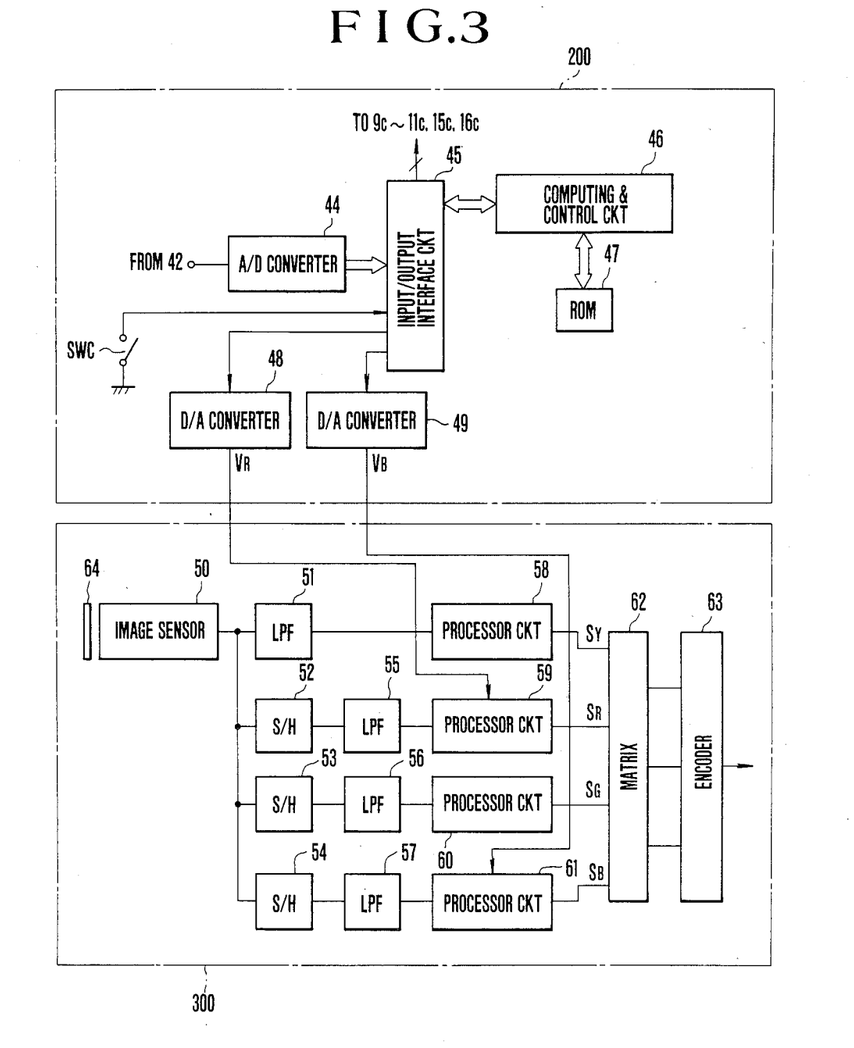
FIG. 3 is a block diagram of the signal processor of the device and an image pickup device associated therewith.

In FIG. 3, there is shown a signal processor 200 having an input which is connected to the outlet 42 of the sensor 100 of FIG. 2 and which constitutes the color information detecting device together with an image pickup device 300. The inlet is connected to an A/D converter for producing a digital output signal corresponding to the output of the amplifier 21. Reference numeral 45 identifies an input/output interface circuit; 46 a computing and control circuit as computing means; 47 a ROM circuit; and D/A converters 48, 49 form gain control signals $V_R$ and $V_B$ to be described later. A switch SWC actuates the color information detecting device.

Figure 4:
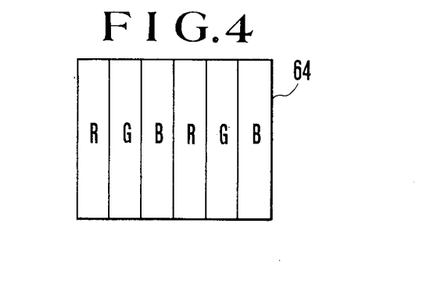
FIG. 4 is a plan view of an example of the construction of a color filter usable with the device.

An image sensor 50 such as a solid state image pickup device serving as image pickup means has a color stripe filter 64 of FIG. 4 at the light receiving surface thereof.

A low pass filter 51 cuts color signal components R, G, B of a high precision modulated by the filter 64 to produce a pseudo-luminance signal. Sample and hold circuits 52 to 54 sample and hold respectively the R, G and B component signals modulated by the filter 64. Low pass filters 55 to 57 cut the high region components of the color signals.

Processor circuits 58 to 61 for the luminance signal, R, G and B component signals respectively perform black level clamp gamma correction, contour correction, white clip and other necessary corrections.

It is noted that the processor circuits 59 and 61 are so constructed that their gains can be controlled in accordance with the outputs of the D/A converters 48 and 49 respectively, or the gain control signals $V_R$ and $V_B$.

A matrix circuit 62 processes pseudo-luminance signal $S_Y$ and color signals $S_R$, $S_G$ and $S_B$ to form color difference signals. An encoder 63 applies a prescribed modulation to the output of the matrix circuit 62 to form a standard television signal.

Figure 5:
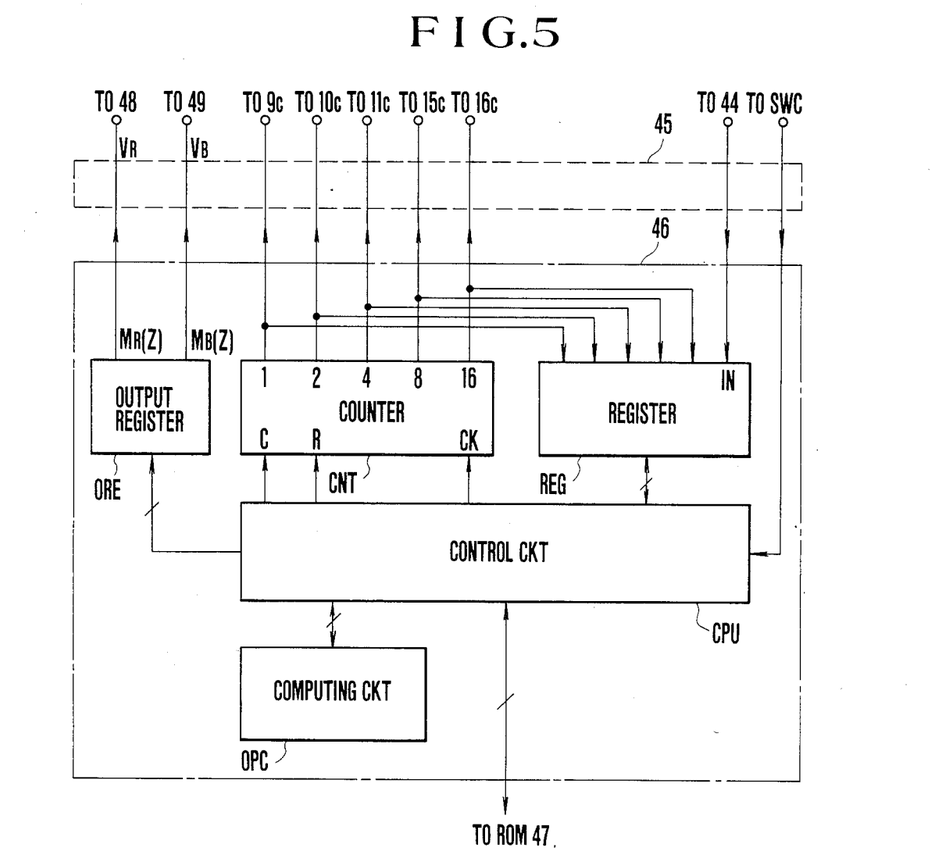
FIG. 5 is an electrical circuit diagram of the computing and control circuit of FIG. 3.

FIG. 5 illustrates the details of the computing and control circuit 46 where ORE is an output register; and CNT is a ring counter. Responsive to clock pulses CK, the ring counter CNT shifts its output of "1" level from the left to the right over the output stages thereof, in sequence. C identifies a carry out terminal; and R a reset terminal upon advent of an actuating signal, to set the least significant bit (LSB) in "1", and the other bits in "0"s. That is, the output of the counter CNT takes a value [00001]. The first (LSB) to the fifth (MSB) output stages of the counter CNT are connected through the interface circuit 45 to the terminals 9c to 11c and 15c and 16c respectively.

Reference symbol REG identifies a first register into which the output of the A/D converter 44 is stored at an address corresponding to the output of the counter CNT through the interface circuit 45, forming means for coinciding a series of outputs of the A/D converter 44 in a prescribed timed relationship. Reference symbol OPC identifies a computing circuit; and CPU a control circuit. This control circuit CPU coordinates the input and output from and to the ROM 47, a computing circuit OPC, and the first register REG, the output to the output register ORE and the counter CNT, and the input of the signal from the switch SWC through the interface circuit 45 based on a program of FIG. 6.

Figure 6:
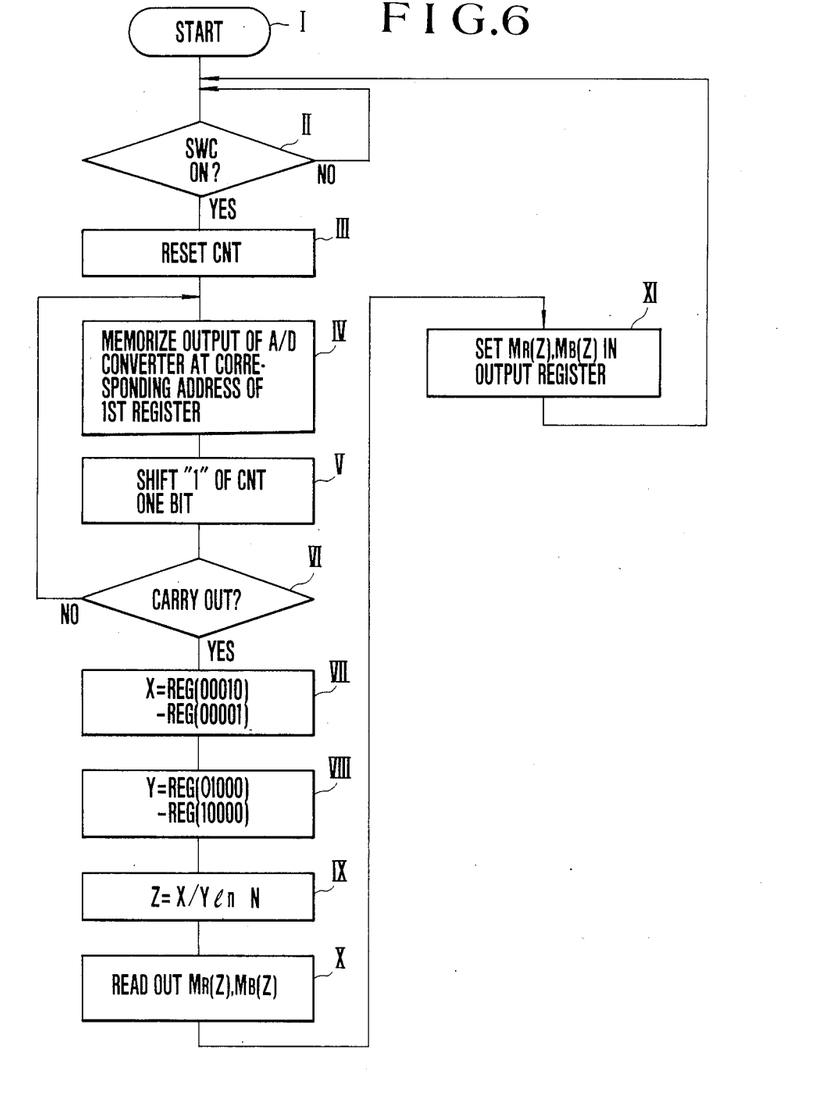
FIG. 6 is a flow chart for the control program in the CPU of FIG. 5.

The operation of the color information detecting device is described by reference to the flow chart of FIG. 6.

When a power switch (not shown) is closed, the computing and control circuit 46 starts to operate, causing program execution to begin with a step I. Then whether or not the switch SWC for actuating the color information detecting device is ON is examined in step II. If OFF, this step II is repeated.

If ON, the procedure advances to step III where the counter CNT in the computing and control circuit 46 is reset so that the output of the counter CNT has [00001] over the fifth (MSB) to the first (LSB) bit positions.

Thereby the switches 9, 13 and 14 of FIG. 2 are turned on, and the switches 10 to 12, 15, 16 are turned off, so that the photo signal from the diode 1 is applied to the non-inverting input of the amplifier 20, while the outputs of the diodes 2 and 8 are short-circuited. Also the outputs of the constant current sources are cut off.

The outputs of the diodes 1, 2 and 8 are proportional to the intensities of the respective color light incident thereon. Of these outputs labelled for now $I_{SR}$, $I_{SB}$ and $I_{SG}$, the photo current $I_{SR}$ enters the amplifier 20. The amplifier 20 with the diode 17 produces an output in the form of a voltage based on the following equation:

Letting $V_F$ and $I_F$ identify the forward directional voltage and the current across and through the diode 17, we have $$I_F = I_{FO} [\exp (qV_F/nkT) - 1] \qquad (1)$$

where
$I_{FO}$: Constant dependent on temperature
q: Charge of electron
k: Boltzmann constant
T: Absolute temperature (°K.)
n: Coefficient For normal use in a range of exp $(qV_F/nkT) \gg 1$, the equation (1) may be approximated by the following equation (2). That is, $$I_F = I_{FO} \exp (qV_F/nkT) \qquad (2)$$

Hence $$V_F = (nkT/q)(\ln I_F - \ln I_{FO}) \qquad (3)$$

Thus the output voltage $V_F$ of the amplifier 20 is proportional to the logarithm of the photo current flowing through each of the diodes 1, 2 and 8.

Here, the diode 1 is assumed to be selectively connected to the amplifier 20, and its output voltage $V_{RF}$ becomes $$V_{RF} = (nkT/q)(\ln I_{SR} - \ln I_{FO}) \qquad (4)$$

This voltage, after having passing through the amplifier 21, becomes $$V_{RF'} = (bkT/q)(\ln I_{SR} - \ln I_{FO}) \qquad (5)$$

where "b" is constant. This $V_{RF'}$ is directed through the A/D converter 44 and the interface circuit 45 to the computing and control circuit 46.

In the next step IV, therefore, the output of the A/D converter 44 is applied through the interface circuit 45 to and memorized in the first register REG at a corresponding address, in this instance, [00001] address. That is, it is in this step that the digital value of the voltage $V_{RF'}$ is memorized in the register REG. Note, the data memorized in the address (a1, a2, a3, a4, a5) of the register REG are represented by REG (a1, a2, a3, a4, a5).

Then, in the step V, one clock pulse is given to the counter CNT, thereby the "1" is shifted one bit. Therefore, the output of the counter CNT becomes [00010]. Responsive to this, the interface circuit 45 turns on the switches 10, 12 and 14 and turns off the switches 9, 11, 13, 15 and 16. Therefore, the output current of the diode 2 is selected for application to the amplifier 20. Then, the output of the amplifier 21 expressed by $$V_{BF} = (bkT/q)(\ln I_{SB} - \ln I_{FO}) \qquad (6)$$

is applied through the A/D converter 44 and the interface circuit 45 to the computing and control circuit 46.

In the next step VI, whether or not the carry out port "1" is examined. Because, up to this time, it does not yet appear, a jump is made back to the step IV. For this time, it is at a [00010] address of the REG that the digital value of the voltage $V_{BF}$ is memorized. Thus, the time-sequentially obtained voltages $V_{RF}$ and $V_{BF}$ coincide.

As the step V is repeated, as has been described above, the counter CNT is shifted left one bit, producing an output [00100]. With the switches 11 to 13 ON and the switches 9, 10, 15 and 16 OFF, $$V_{GF} = (bkT/q)(\ln I_{SG} - \ln I_{FO}) \tag{7}$$

is obtained.

Having jumped back to the step IV, its digital value is then memorized in a [00100] address of the register REG. In the next step V, the counter CNT is shifted one bit, producing an output [01000], thereby the switches 12 to 15 are turned on, and the switches 9–11 and 16 are turned off.

Therefore, the amplifier 20 is supplied with $16i_1$ and produces an output expressed by $$V_{16i_1F} = (nkT/q)(\ln 16i_1 - \ln I_{FO}) \tag{8}$$

Furthermore, at the output of the amplifier 21 is produced $$V_{16i_1F} = (bkT/q)(\ln 16i_1 - \ln I_{FO}) \tag{9}$$

In the next step VI, because no carry out is produced yet, once more a jump is made to the step IV where the digital value of this $V_{16i_1F}$ is memorized at a [01000] address of the register REG.

Again, in the step V, the counter CNT is shifted one bit, producing an output [10000], with the result that the switches 12–14 and 16 are ON, and the switches 9–11 and 15 are OFF. Then obtained at the output of the amplifier 21 is $$V_{i_1F} = (bkT/q)(\ln i_1 - \ln I_{FO}) \tag{10}$$

In the next step VI, the carry out is examined. Because "1" is not produced yet, another jump is made back to the step IV where the digital value of the $V_{i_1F}$ is memorized at a [10000] address of the register REG.

In the step V, when the counter CNT is further shifted one bit, it produces a carry out.

Therefore, in the next step, this is detected. The procedure advances to a step VII where the information REG[00001] at the [00001] address of the register is subtracted from the information REG[00010] at the [00010] address of the register to obtain $$X = REG[00010] - REG[00001] \tag{11}$$

From the equations (5) and (6), we find $$X = (bkT/q)(\ln I_{SB} - \ln I_{SR}) \tag{12}$$

It is to be understood that since, in the embodiment of the present invention, the $I_{FO}$ is common, it is very easy to achieve superior temperature correction.

In the next step VIII, similarly $$Y = REG[01000] - REG[10000]$$

is computed. From the equations (9) and (10), we find $$Y = (bkT/q)(\ln 16i_1 - \ln i_1) \tag{13}$$
$$= (bkT/q) \ln 16$$

Here too, the $I_{FO}$ is common. Therefore, no error due to the difference of the non-linear conversion from element to element is produced.

In the next step IX, $$Z = (X/Y) \ln N \tag{14}$$

is computed.

Here N represents the ratio of the output current from the first constant current source to the output current from the second constant current source, and, in this instance, taken at a value:

$$N = 16i_1/i_1 = 16 \tag{15}$$

Hence $$Z = \ln I_{SB} - \ln I_{SR}$$
$$= \ln(I_{SB}/I_{SR})$$

is obtained. The value of Z is now found in the form of the logarithm value of the ratio of the photo currents of the diodes 1 and 2. Thus, according to the present invention, the color information, sufficiently corrected for temperature change, can be detected by simple means.

In the next step X, data $M_R(Z)$ and $M_B(Z)$ previously memorized in the ROM 47 at a corresponding address to the value of the Z are read out in such a manner that of all the data at that address, for example, a first half of a few bits are taken as $M_R(Z)$, and a second half of a few bits as $M_B(Z)$. In the next step XI, the thus-read $M_R(Z)$ and $M_B(Z)$ are set in the output register ORE.

After that, a jump is made back to the step II, where examination is made as to whether the switch SWC is ON or OFF. If ON, the foregoing procedure is recycled again.

It is noted that the output register ORE, after having once been set in the step XI of the preceding cycle, retains its output until the step XI is carried out again.

Then, the outputs $M_R(Z)$ and $M_B(Z)$ of the register ORE are applied to the respective D/A converters 48 and 49 and therefrom applied as the gain control signals $V_R$ and $V_B$ to the processor circuits 59 and 61. Whereby the ratio of the gains of the processor circuits 59, 60 and 61 varies as a prescribed function of the ratio of the outputs of the photosensitive diodes 1 and 2. That is, the larger the ratio $I_{SR}/I_{SB}$, the smaller the gain of the processor circuit 59 becomes when compared to the gain of the processor circuit 60.

Though the foregoing embodiment has been described in connection with the use of diodes as the photo-electric transducer means for color detection, the present invention is not confined to the diodes. Transistors may be otherwise used instead. CdS may be used as well.

In the illustrated embodiment, as the non-linear conversion means use is made also of a diode. This, too, may be replaced by a transistor.

Again, in the illustrated embodiment, the coincidence means is in the form of a first register. But in the case when the analog signal is processed throughout, it may take the form of a sample and hold circuit.

It is of course possible to apply the present invention to not only the devices for detecting color temperatures, but also any device for detecting color information. It is also needless to say that the present invention is applicable to any device for detecting followed by non-linear converting light information.

Also, the non-linearity of conversion is not confined to the logarithmic compression, but may be another one, provided that is can be specified. For example, the conversion is a non-linear expansion to which the present invention is applicable as well. Also, the output $I_{SG}$ of the green light sensing means may be used for correcting $I_{SR}/I_{SB}$.

As has been described above, according to the present invention, the color information detecting device is constructed with a plurality of means for sensing respective different color lights from one another, converting means for converting the input signal non-linearly, changeover means for selectively inputting the outputs of said color light sensing means to said converting means, coincidence means for sampling and holding the time-sequential outputs of the converting means, and computer means for computing the coincided signals with one another, thereby giving an advantage that the circuit can be designed in a simple form as compared with the use of a corresponding number of logarithmic compression circuits to the number of color light sensing elements. Moreover, a more important advantage is that the temperature characteristic of the logarithmic compression or other non-linear conversion circuit can be corrected with improved accuracy. Another feature is that a first constant current source for supplying a prescribed constant circuit and a second constant current source for supplying a constant current prescribed times as large as the supplied current from the first constant current source are also included and arranged so that the outputs of the first and second constant current circuits are selectively applied to the converting means by the common changeover means of the color light sensing means, whereby the temperature proportion terms resulting from the non-linear conversion of the electrical signal obtained by the color sensing means can be removed with high accuracy, while nevertheless preserving the simplicity of structure of the device.

What is claimed is:

1. A color information detecting device comprising:
a plurality of color sensing means for sensing different color lights from one another;
converting means for non-linearly converting an input signal;
current source means for generating a plurality of predetermined levels of constant current;
changeover means for selectively inputting the outputs of said color sensing means and said plurality of predetermined levels of constant current into said converting means for generating non-linearly converted outputs, respectively; and
computing means for computing said non-linearly converted outputs each other to generate a color temperature information removed of a temperature error.

2. A device according to claim 1, wherein
said plurality of color sensing means include a red color sensor for detecting a red color, and a blue color sensor for detecting a blue color.

3. A device according to claim 2, wherein
said plurality of color sensing means further include a green color sensor for detecting a green color.

4. A device according to claim 1, wherein
said converting means includes a logarithmic compression circuit for logarithmically compressing an input signal.

5. A device according to claim 1, wherein
said computing means includes an analog-to-digital converter for converting each of the successive outputs of said converting means to a digital signal.

6. A device according to claim 1, further comprising:
image pickup means for converting an optical image to color video signals; and
means responsive to the output of said computing means for adjusting the balance of all the color signals out of the output signals of said image pickup means.

7. A device according to claim 6, wherein
said balance adjusting means includes gain controllers for adjusting the gains of all the color signals out of the output signals of said image pickup means.

8. A non-linear converting device comprising:
photo-electric transducer means for converting incident lights into electrical signals;
a first constant current source for supplying a predetermined constant current;
a second constant current source for supplying a constant current equal to a predetermined number of times the supplied current of said first constant current source;
converting means for non-linearly converting an input signal;
changeover means for selectively applying the outputs of said photo-electric transducer means, and said first and said second constant current sources to said converting means; and
correction means for correcting temperature errors contained in the outputs of the photo-electric transducing means through said converting means by using the outputs of the first and second constant current sources through said converting means.

9. A device according to claim 8, further comprising:
computing means for computing said outputs of said photo-electric transducing means and said first and second constant current sources through said converting means.

10. A device according to claim 8, wherein said photo-electric transducer means includes a plurality of color sensing means for detecting different color lights from one another.

11. A device according to claim 10, wherein said plurality of color sensing means include a red color sensor for detecting a red color, and a blue color sensor for detecting a blue color.

12. A device according to claim 11, said plurality of color sensing means further include a green color sensor for detecting a green color.

13. A device according to claim 8, wherein said converting means includes a logarithmic compression circuit for logarithmically compressing an input signal.

14. A device according to claim 8, wherein said correction means includes an analog-to-digital converter which converts the outputs of the converting means into a digital signal and a memory which stores the digital signal.

15. A non-linear converting device comprising:
photo-electric transducer means for converting incident lights into electrical signals;
a first constant current source for supplying a predetermined constant current;

a second constant current source for supplying a constant current equal to a predetermined number of times the supplied current of said first constant current source;

converting means for non-linearly converting an input signal;

changeover means for selectively applying the outputs of said photo-electric transducer means, and said first and said second constant current source to said converting means;

computing means for computing said outputs of said photo-electric transducing means and said first and second constant current sources through said converting means;

image pickup means for converting an optical image to color video signals; and means responsive to the output of said computing means for adjusting the balance of all the color signals out of the output signals of said image pickup means.

16. A device according to claim 15, wherein said balance adjusting means includes gain controllers for adjusting the gains of all the color signals out of the output signals of said image pickup means.

17. A device according to claim 15, wherein said photo-electric transducer means includes a plurality of color sensing means for detecting different color lights from one another.

18. A device according to claim 17, wherein said plurality of color sensing means include a red color sensor for detecting a red color, and a blue color sensor for detecting a blue color.

19. A device according to claim 18, wherein said plurality of color sensing means further include a green color sensor for detecting a green color.

20. A device according to claim 15, wherein said converting means includes a logarithmic compression circuit for logarithmically compressing an input signal.

21. A device according to claim 15, wherein said computing means includes an analog-to-digital converter for converting each of the successive outputs of said converting means to a digital signal.

* * * * *